United States Patent Office

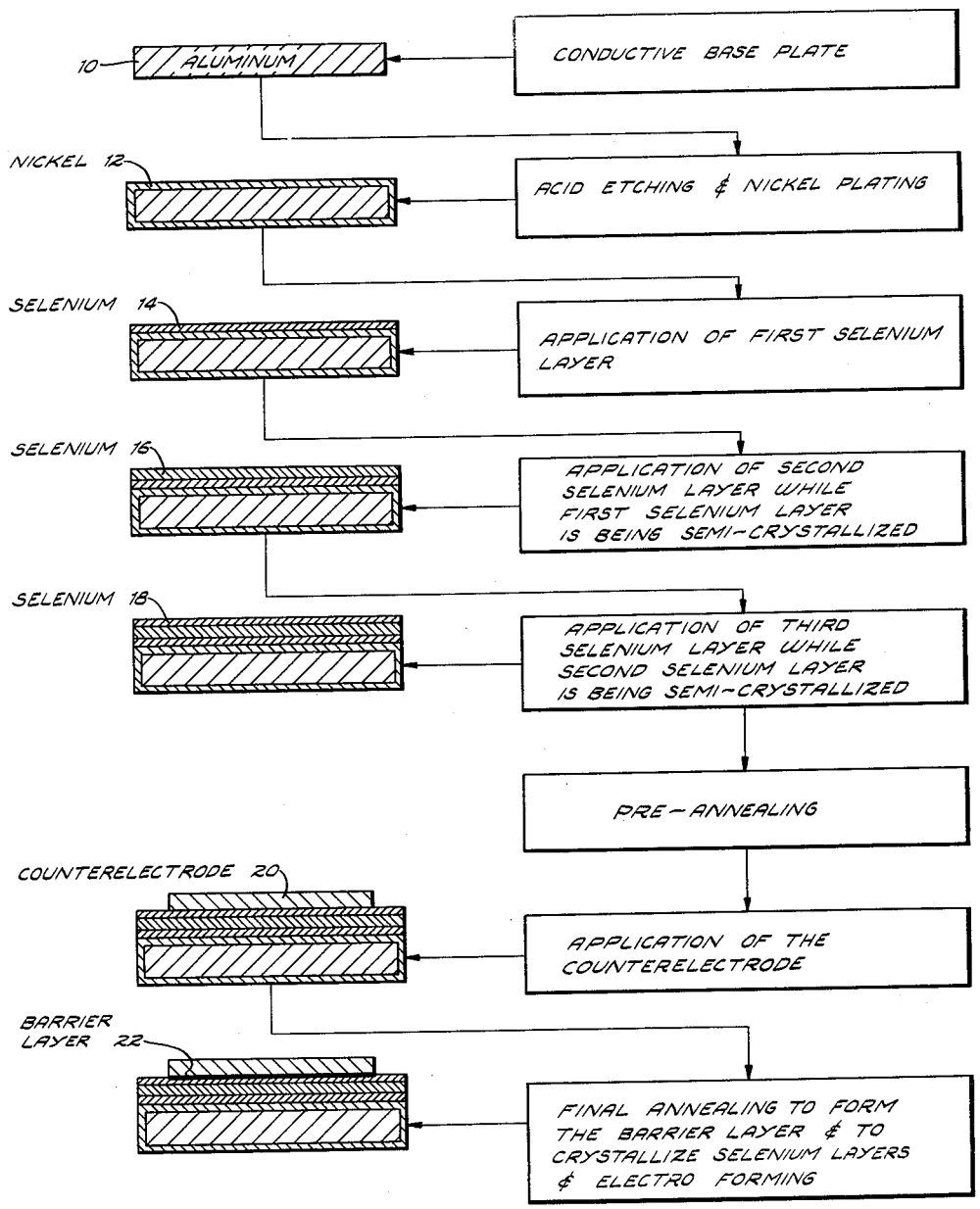

3,052,572
Patented Sept. 4, 1962

3,052,572
SELENIUM RECTIFIERS AND THEIR METHOD
OF MANUFACTURE
Alfred Max Hase, Toronto, Ontario, Canada, assignor to McGraw-Edison Company, Milwaukee, Wis., a corporation of Delaware
Filed Sept. 21, 1959, Ser. No. 841,073
13 Claims. (Cl. 117—200)

The present invention relates to electrical rectifiers and, more particularly, to selenium rectifiers and methods of manufacturing the same.

It is an object of the invention to provide selenium rectifiers having an extremely low forward resistance drop.

It is another object of the invention to provide an improved method of producing selenium rectifiers wherein an excellent ohmic contact is provided between the base metal and the selenium.

A further object of the invention is to provide a method of making selenium rectifiers having a plurality of layers of crystallized selenium.

A still further object of the invention is to provide a method of making selenium rectifiers wherein a natural barrier layer is produced between the upper selenium layer and the counterelectrode.

It is yet another object of the invention to provide a selenium rectifier capable of operating at high temperatures so that a high blocking voltage is permissible without adversely affecting the life of the rectifier.

A still further object of the invention is to provide a selenium rectifier capable of conducting very high current densities.

These and other objects of the invention will become more apparent from the detailed description of the invention taken with the accompanying drawing which shows the rectifier plate, in exaggerated proportions, during different stages in the process of its manufacture.

The general method to which the instant invention applies comprises the application of selenium to a metallic conducting base plate, heat treating the selenium coated electrode for a period of time sufficient to convert the selenium to a crystalline or conducting state, applying a counterelectrode and applying or forming a barrier layer between the counterelectrode and the selenium. The blocking voltage and forward conductivity characteristics of the rectifier thus produced is developed by subjecting it to an electric current in the reverse direction. The blocking voltage of a rectifier is that A.C. voltage which may be applied thereto without exceeding the maximum allowable reverse current, as determined by the permissible power dissipation. The latter is dictated by the highest temperature that the rectifier can withstand without deterioration.

In general terms, the invention comprises a method of making selenium rectifiers which includes applying to a conductive base plate a plurality of selenium layers having differing quantities of a halogen impurity and semi-crystallizing each layer while the next succeeding layer is being applied. This semi-crystallization is carried out at a temperature which is low enough to prevent the selenium from crystallizing thereby preventing the formation of barrier layers between adjacent selenium layers, but is sufficiently high to prepare the selenium for the final annealing operation which places it in its final crystalline form. This also provides a halogen impurity gradient through the selenium so that there is good electrical conductivity at the junction between the selenium and the base while the barrier layer forming ability of the upper surface of the selenium is not adversely affected. The plate thus formed is annealed before and after the application of the counterelectrode which in addition to crystallizing the selenium, forms a natural barrier layer between the upper surface of the selenium and the counterelectrode. The upper selenium layer is provided with other impurities such as bismuth, antimony or arsenic which enhance the formation of the barrier layer with the counterelectrode.

Referring now to the drawing in greater detail, a base electrode 10 of a suitable conducting material such as aluminum is etched in an acid bath and then nickel plated. The acid bath roughens the surface of the aluminum to increase its contact area. While the nickel 12 may be applied by any well known plating process, it is preferred that the plating be carried out in a "Watts type" Ni-bath at a current density of .1–.3 amp./in.$^2$ and a pH of 5.2–5.8. The specified pH range is desirable to prevent the formation of oxides in the surface of the nickel which would have a tendency to form a barrier layer with selenium.

The next operation is the application of the first selenium layer 14. This may be applied by any one of a number of known methods such as by placing the base plate in a high vacuum chamber in which selenium has been vaporized or by brushing selenium dust of approximately 200–300 mesh onto the plate and then heating the base plate to fuse the selenium to the nickel layer. The first selenium layer 14 preferably has a thickness of .0002–.0004" and includes .8–3 chlorine atoms for every 1,000 selenium atoms. The chlorine atoms increase the conductivity of the selenium so that a high current density will be possible in the area of the base plate. If the amount of chlorine available falls below the lower limit, sufficiently high conductivity will not be realized, while if the upper limit of 3 chlorine atoms per 1,000 selenium atoms is exceeded, there will be a tendency to form an undesired barrier layer at the upper surface of the selenium layer. The amount of chlorine impurity in the first selenium layer also controls the number of chlorine atoms which will be given up to the other selenium layers as well as the final crystallization of said first selenium layer.

The base plate containing the nickel plate 12 and the first selenium layer 14 is then placed into a high vacuum chamber along with a quantity of amorphous selenium containing a small amount of chlorine. The temperature of the vacuum chamber is elevated to 95–130° C. to vaporize the amorphous selenium which then deposits on the base plate to provide a second selenium layer 16. The quantity of selenium placed in the chamber is limited so that it will form a layer having a thickness of .0015–.003" and containing 1–2 chlorine atoms per each 3,000 selenium atoms. Simultaneous with the formation of the second selenium layer 16, the temperature within the vacuum chamber transforms the first selenium layer 12 into a semi-crystalline state. It is important that the upper temperature limit of 130° C. is not exceeded so that a barrier layer will not form between the first selenium layer 14 and the second selenium layer 16.

In order to improve the conductivity of the second selenium layer .1–1 tellurium atom may be added for each 1,000 selenium atoms. If the quantity of tellurium exceeds this upper limit, the crystalline structure of the selenium may be effected in a manner tending to adversely affect its conductivity.

In a similar manner, the third selenium layer 18 is applied by placing the base plate in a vacuum chamber maintained at a temperature of between 100–135° C. and containing a quantity of amorphous selenium having a small amount of bromine or iodine impurity. The amount of amorphous selenium added to the vacuum chamber is sufficient to provide a third selenium layer having a thickness ranging from .00015–.0003" and containing 1–2 bromine or iodine atoms for each 4,000 selenium atoms and 1–10 bismuth, antimony or arsenic atoms for each 3,000 selenium atoms. Bromine or iodine is utilized in the third selenium layer rather than chlorine because they produce a finer crystalline structure and aid in the thermal and electrical formation of a barrier layer as will be discussed hereinafter. Also, bismuth, arsenic or antimony perform the function of enhancing the formation of an N-type barrier at the junction with the counterelectrode 20. It is necessary to maintain the vacuum chamber at a slightly higher temperature while depositing the third selenium layer than when the second layer is being deposited because of the presence of the bromine or iodine.

During the application of the third selenium layer the temperature of the evaporation chamber transforms the second selenium layer into a semi-crystalline state. Here again, the upper limit of the temperature range is low enough so that a barrier layer is not formed between the second and third selenium layers. In this manner, distinct layers of semi-crystalline selenium are formed without the formation of barrier layers therebetween.

It can be seen that the amount of halogen decreases in each succeeding selenium layer. This is done for two reasons. First, it is desirable to have an impurity gradient through the selenium layers so that there is a high percentage of impurity at the junction with the nickel 12 to enhance conductivity, and a smaller percentage of halogen at the junction of the third selenium layer 18 and the counterelectrode 20 so that the formation of a barrier layer therebetween is not inhibited. In addition, a greater amount of halogen is necessary in certain layers because a portion of the impurity is lost from each during each of the heating operations. Hence, the first selenium layer, for example, which is subjected to the greatest number of heating operations and consequently, loses the largest quantity of impurity, must, in order to compensate, contain a greater amount than the other layers.

After the application of the third selenium layer 18, the rectifier plate is then placed in an annealing oven where it is heated at a temperature of 100–150° C. for a period of one-half to 8 hours. This has the effect of diffusing the halogen between the various selenium layers, of placing the third selenium layer in a semi-crystalline state and of preparing all of the selenium layers for the final annealing operation.

Following this pre-annealing operation a metallic counterelectrode containing 20–50 atomic percent cadmium, .01–.10 atomic percent thallium, indium or gallium and the remainder any suitable metal such as tin, is applied to the third selenium layer 18 in any convenient manner such as by spraying. The counterelectrode is preferably applied to a thickness of between .0015–.003".

The rectifier is finally subjected to a two stage final annealing process during which time a natural barrier layer is formed between the counterelectrode 20 and the third selenium layer 18. The first stage of the final annealing operation is carried out at a temperature of from 100–150° C. during which time that portion of the counterelectrode 20 in contact with the third selenium layer starts forming a cadmium selenide compound which is an N-type material while the third selenium layer containing bismuth, antimony or arsenic remains P-type. As a result, a P-N junction is formed between the third selenium layer and the counterelectrode.

The second stage of the final annealing operation consists of raising the temperature of the annealing oven to a value of between 190–210° C., which causes the counterelectrode to fuse to the third selenium layer thereby completing the formation of the N-type cadmium selenide compound which acts a a natural barrier layer 22 between the two without the necessity of utilizing an artificial barrier layer. During the first of the final annealing stages the thallium, indium or gallium impurity collects into the barrier layer region but does not diffuse to the selenium itself because it is prevented from so doing by cadmium selenide formed in the counterelectrode. These impurities do, on the other hand, tend to widen the barrier layer which improves the rectifying properties of the device. The two final annealing stages are carried on for a period of from .2–2 hours depending on the temperature of each. During the second stage, in which the temperature is elevated to between 190–210° C., the selenium is transformed into its crystalline or best conducting state.

Finally, the device is subjected to an electroforming operation to develop the final blocking voltage and forward conductivity characteristics of the rectifier. This is accomplished by subjecting the plates to a reverse voltage having a magnitude of from 35–60 volts wherein the temperature of the plates is raised to a value of between 60–130° C.

It has been found that plates produced in the foregoing manner have extremely low forward drop, excellent reserve properties, a long life and are able to conduct a current density much higher than heretofore obtainable.

While only a single embodiment of the invention is shown and described, it is intended to cover in the appended claims, all modifications thereof that fall within the true spirit of the invention. Further, while the invention has been described with reference to one particular type of apparatus, it will be understood by those skilled in the art, that the process may be performed by other apparatus as well.

I claim:

1. In a method of making selenium rectifiers, the steps of applying three selenium layers having differing quantities of halogen impurities on a conductive base plate, maintaining the temperature of each selenium layer at a value insufficient to cause complete crystallization during the application of all succeeding selenium layers so that said selenium layers are all in a semi-crystallized state, preannealing said semi-crystallized selenium layers, applying a counterelectrode, and annealing said plate to crystallize said selenium layers and to fuse said counterelectrode into the third selenium layer to produce a barrier layer of the P–N type and electro-forming the plate thus produced.

2. In the method of making selenium rectifiers, the steps of applying on a conductive base plate a first selenium layer having a thickness of .0002–.0004" and including .8–3 chlorine atoms for each 1,000 selenium atoms, fusing said first selenium layer to said base plate, applying second and third selenium layers having successively smaller amounts of a halogen impurity relative to said first selenium layer, maintaining the temperature of each selenium layer at a value insufficient to cause complete crystallization during the application of all succeeding selenium layers so that said selenium layers are all in a semi-crystallized state, pre-annealing said semi-crystallized selenium layers, applying a counterelectrode, annealing said selenium layers so that the counterelectrode is fused to the third selenium layer to produce a barrier layer of the P–N type.

3. In the method of making selenium rectifiers, the steps of applying on a conductive base plate a first selenium layer, a second selenium layer having a thickness of .00015–.003" and including 1–2 chlorine atoms for each 3,000 selenium atoms, and a third selenium layer, maintaining the temperature of each selenium layer at a value insufficient to cause complete crystallization during the application of all succeeding selenium layers so that said selenium layers are all in a semi-crystallized state, pre-annealing said semi-crystallized selenium layers, applying a counterelectrode, and annealing said selenium layers so that said selenium layers are crystallized and said counterelectrode is fused to the third selenium layer to produce a natural barrier layer of the P–N type.

4. The method of making selenium rectifiers as set forth in claim 3 wherein the second selenium layer contains .1–1 tellurium atom for every 1,000 selenium atoms.

5. In the method of making selenium rectifiers, the steps of, applying on a conductive base plate first and second selenium layers, applying a third selenium layer .00015–.0003" thick and containing 1–2 atoms of a halogen taken from the group consisting of bromine and iodine for each 4,000 selenium atoms, maintaining the temperature of each selenium layer at a value insufficient to cause complete crystallization during the application of all succeeding selenium layers so that said selenium layers are all in a semi-crystallized state, pre-annealing said semi-crystallized selenium layers, applying a counterelectrode, annealing said selenium layers so that said selenium layers are crystallized and said counterelectrode is fused to the third selenium layer to form a barrier layer of the P–N type.

6. The method of making selenium rectifiers as set forth in claim 5 wherein the third selenium layer includes 1–10 atoms of an element taken from the group consisting of bismuth, antimony and arsenic for each 3,000 selenium atoms.

7. The method of making selenium rectifiers comprising the steps of applying a plurality of selenium layers on a conductive base plate, maintaining the temperature of each selenium layer at a value insufficient to cause complete crystallization during the application of succeeding selenium layers so that said selenium layers are all in a semi-crystallized state, pre-annealing said semi-crystallized selenium layers at 100–150° C. for a period of ½ to 8 hours, applying counterelectrode, and annealing said selenium layers so that said selenium layers are crystallized and said counterelectrode is fused into the third selenium layer to produce a barrier layer of the P–N type.

8. The method of making selenium rectifiers comprising the steps of applying a plurality of selenium layers on a conductive base plate, maintaining the temperature of each selenium layer at a value insufficient to cause complete crystallization during the application of succeeding selenium layers so that said selenium layers are all in a semi-crystallized state, pre-annealing said semi-crystallized selenium layers, applying counterelectrode, and annealing said selenium layers at temperatures of 100–150° C. and 190–210° C. for a period of .2–2 hours so that said selenium layers are crystallized and said counterelectrode is fused into the third selenium layer to produce a barrier layer of the P–N type.

9. A selenium rectifier having a conductive base plate, first, second and third crystallized selenium layers and a counterelectrode, said first selenium layer being .0002–.0004" thick and containing not more than 3 chlorine atoms for every 1,000 selenium atoms, said second selenium layer being .0015–.003" thick and containing less than 2 chlorine atoms for each 3,000 selenium atoms, said third selenium layer being .00015–.0003" thick and containing less than one atom for each 2,000 selenium atoms of an element taken from the group consisting of bromine and iodine, the impedance to a current flow in either direction between said selenium layers being relatively small, said counterelectrode being fused to the last selenium layer so that a natural barrier of the P–N type is disposed therebetween.

10. The selenium rectifier as set forth in claim 9 wherein said second selenium layer also contains .1–1 tellurium atom for every 1,000 selenium atoms and wherein said third selenium layer also contains .1–10 atoms for each 3,000 selenium atoms of an element taken from the group consisting of bismuth, antimony and arsenic.

11. The selenium rectifier as set forth in claim 9 wherein the counterelectrode is .0015–.003" thick and contains 20–50 atomic percent cadmium.

12. The selenium rectifier as set forth in claim 11 wherein the counterelectrode includes .1–10 atomic percent of a substance taken from the group consisting of thallium, indium and gallium.

13. The method of making selenium rectifiers comprising the steps of applying a plurality of selenium layers on a conductive base plate, maintaining the temperature of each selenium layer at a value insufficient to cause complete crystallization during the application of all succeeding selenium layers, annealing said selenium layers, applying a counterelectrode .0015–.003" thick, said counterelectrode containing .20–.50 atomic percent cadmium and .01–.1 atomic percent of an element taken from the group consisting of thallium, indium and gallium, and re-annealing said selenium layers so that the counterelectrode is fused into the third selenium layer to produce a barrier layer of the P–N type.

References Cited in the file of this patent

UNITED STATES PATENTS

| | | |
|---|---|---|
| 2,745,047 | Lighty | May 8, 1956 |
| 2,819,433 | Smith | Jan. 7, 1958 |
| 2,914,837 | Schweickert et al. | Dec. 1, 1959 |

FOREIGN PATENTS

| | | |
|---|---|---|
| 452,816 | Canada | Nov. 23, 1948 |

OTHER REFERENCES

Semiconductor Abstracts, vol. IV, 1956, abstract 441, page 132.